June 21, 1966    R. M. G. BOUCHER ETAL    3,256,677
DEFOAMING
Original Filed Nov. 21, 1961    2 Sheets-Sheet 1

INVENTOR.
RAYMOND MARCEL GUT BOUCHER
ARNOLD L. WEINER
BY

ATTORNEY

June 21, 1966   R. M. G. BOUCHER ET AL   3,256,677
DEFOAMING
Original Filed Nov. 21, 1961   2 Sheets-Sheet 2

*INVENTOR.*
RAYMOND MARCEL GUT BOUCHER
ARNOLD L. WEINER
BY

*ATTORNEY*

3,256,677
DEFOAMING
Raymond Marcel Gut Boucher, Metuchen, N.J., and Arnold L. Weiner, Cortland, N.Y., assignors to Mixing Equipment Co. Inc., Rochester, N.Y., a corporation of New York
Continuation of application Ser. No. 153,851, Nov. 21, 1961. This application Feb. 5, 1965, Ser. No. 432,450
3 Claims. (Cl. 55—53)

This application is a continuation of our co-pending application Serial No. 153,851, filed November 21, 1961, for Defoamer, and now abandoned.

This invention relates generally to a method for liquefying foam and more specifically to a method for liquefying foam within a container through the use of a high velocity sheet of air.

The creation and dispersal of generated foam is an inherent problem in many industrial processes and a variety of methods have been proposed and used as foam destroying or liquefying means. Procedures now in use involve generally both mechanical and chemical means of foam destruction. Mechanical devices such as centrifugal pumps involve very cumbersome and often very expensive equipment and further are limited in the capacity and amount of foam which may be handled thereby. The addition of anti-foam chemicals presents the problem of a later separation of the chemicals from the liquid in use and further has the inherent possibility of being detrimental to the end product.

Accordingly, it is an object of this invention to provide a foam destroying device which does not require the addition of chemicals to the foam nor does it require any moving mechanical parts in the defoaming device itself.

Broadly speaking, the present invention comprises a jet of air preferably ejected from a nozzle at supersonic velocity which is deflected in a manner such that a thin high velocity sheet or disc of air is formed above the foam within a container. Due to pressure differentials within the sheet of air thus created, the foam is drawn upwardly where it is converted into aerosol and liquid droplets which may be forced radially against the side of the container and thereby return to the bottom of the container in the form of a liquid.

An illustrative example of the invention will be described with reference to the accompanying drawings in which;

FIG. 1 is a schematic view of the nozzle, deflector and container of the present invention;

FIG. 2 is a schematic presentation of the nozzle and deflector together with the various pressures and velocities existing during operation thereof;

Figure 3:
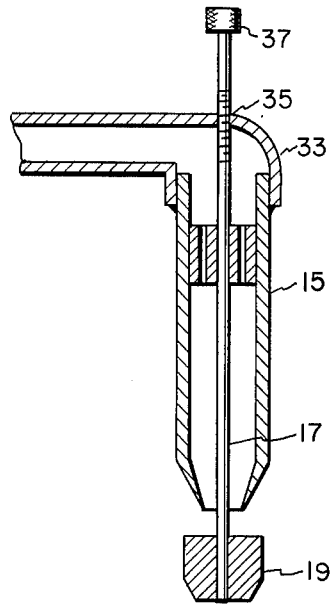
FIG. 3 is a sectional view of one means for adjusting the distance of the deflector from the nozzle.

Turning now more specifically to the drawings, FIG. 1 shows a tank 11 containing generated dynamic foam 13. Located centrally within the container 11 is a conduit 15 terminating at its lower end in a nozzle 16. Compressed air of a sufficient pressure is provided through the conduit to the nozzle so that the velocity of the jet of air leaving the nozzle is supersonic, which would be above approximately 20 p.s.i.g.

In order to create a thin sheet of air extending about the circumference of the container, a deflector 19 having a substantially flat face 21 is interposed between the nozzle 16 and the dynamic foam 13. Accordingly, when the jet of air leaving the nozzle strikes the face 21 of the deflector 19, the supersonic jet spreads out to form the desired thin sheet of high velocity air. The action of the deflector on the supersonic air stream results in the dynamic foam rising upwardly to and around the deflector for reasons which will be discussed in connection with FIG. 2. The high velocity sheet of air carries the foam outwardly and this sudden acceleration of the bubbles results in the liquefication of the foam, producing fine aerosol 23 and small droplets 25 which are forced against the side of tank 11 and form liquid 27, which then returns to the liquid at the bottom of the container. A filter may also be provided at the top of the container to entrain ultrafine particles which may be liquefied and returned.

FIG. 2 shows pressure and velocity variations which occur as a result of the high velocity of the air leaving the nozzle 16. The air, which passes through orifices 31 in the stem support member 29 in order to assure a straight flow thereof, passes downwardly and is of a sufficient pressure such that the velocity $V_a$ at the nozzle is supersonic. Accordingly, the maximum velocity $V_{max.}$ in the Y direction occurs at the point where the jet of air strikes the face 21 of the deflector plate 19. With the deflector face 21 substantially perpendicular to the jet of air, the air is deflected evenly about the vertical axis of the conduit and deflector. Therefore, the maximum velocity of the air in the X direction will occur approximately at the point that the sheet of air changes direction through impingement on the deflector face 21, and this velocity will decrease as the distance from the deflector 19 increases. Accordingly, the velocities as depicted in FIG. 2 indicate that $V_{max.}$ is greater than $V_1$ which is greater than $V_2$.

Due to the change in velocity of this air sheet as it approaches the wall of the container, minimum pressure will be created within and about the area of the air sheet at a point as indicated in the drawing. As the velocity decreases the pressure will increase and the result will be that the minimum pressure $P_{min.}$ is less than $P_1$ which is less than $P_2$. The low pressure area thus created about the deflector will cause the dynamic foam to be lifted upwardly in a vortex like motion and into the flow of the high velocity sheet of air and subsequently rapidly blown outwardly in the X direction toward the side of the container.

The primary consideration is, of course, the destruction of the foam and this occurs due to the foam entering the high velocity air sheet wherein it is subjected to a sudden violent acceleration. Accordingly, the foam is reduced to droplets before it strikes the sides of the container and the container acts as a collector for these drops with the resultant fluid moving down the sides of the container to mix with the fluid present in the bottom thereof. The only limitation on the size of the container would be the possibility of foam building up on the sides thereof which would not be subjected to the pressure differential created by the sheet of air.

The dimensions of the supersonic defoamer of the present invention may be varied to suit the particular application and requirements. The following test results were obtained when using a nozzle aperture diameter of .188 in., a deflector diameter of .474 in. with the deflector adjusted to .10 in. from the nozzle outlet and the deflector placed from 8 to 12 in., from the normal foam level.

A solution of Artic Sytex 036, which is used under the trade name Colgate Foaming Agent, and water with a concentration of 12.5 gms. of "036" to 16 liters of water was used in the test. The device of the present invention was able to hold a foaming rate of 13.3 feet per minute with a foam volume of 9.6 cubic feet per minute when the pressure of the compressed air line feeding the unit was 45 p.s.i.g. with an air consumption of 14.6 c.f.m. Additionally, a foam of the same concentration as above was controlled at a foaming rate of 15.4 feet per minute with a foam volume of 11.1 cubic feet per minute at an air line pressure of 47.5 p.s.i.g. with an air consumption of 15.4 c.f.m.

Figure 4:
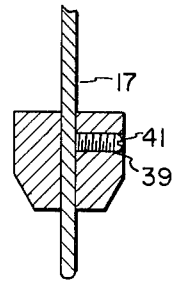
FIG. 4 is a partial sectional view of a further means of adjusting the deflector.

It is advantageous to be able to adjust the distance of the deflector from the nozzle outlet in accordance with the pressure supplied in the conduit. Since it is desirable to obtain the maximum air velocity of the jet with a reasonable pressure drop at the point where the jet strikes the deflector plate, the plate should be adjusted for this position which will vary according to the air pressure supplied to the conduit. This adjustment may be made in any well known manner. However, two satisfactory methods are shown in FIGS. 3 and 4. In FIG. 3 an elbow section 33 is secured to the upper portion of conduit 15 and has a tapped threaded hole 35 therein. The deflector is permanently fixed to the stem and the stem is threaded at a section which passes through the tapped hole 35 and extends upwardly to a control knob 37. This type of control enables the operator to vary the distance between the nozzle and deflector even if the unit is in an inaccessible area. The length of the stem can be as long as the material will allow up to a point where column buckling is reached.

The adjustment of FIG. 4 is simpler than that described above in connection with FIG. 3 and may be used when the deflector is accessible. In this embodiment, the deflector is slidable upon the stem and has a tapped threaded hole 39 therein whereby the set screw 41 may be loosened for adjustment and then tightened to hold the deflector in place.

It is possible to adjust the spacing of the nozzle and deflector plate through a considerable range to produce disc shaped flows of air sufficient to operate satisfactorily, that is to say, to produce sufficient negative pressure beyond the deflector disc to suck up foam. The range variation is affected to some extent by the pressure of the air available, maximum separations being obtained only with fairly high pressures. In general, if the separation of a nozzle from the deflector plate is designated by $h$ and nozzle diameter by $d$, the practical value of the ratio $h/d$ will vary from about .05 to 3. When a satisfactory ratio is achieved within this above limit, it is to be understood that the above described device will function when the deflector is permanently spaced and fixed.

It has been noted that it is preferred to have the air jet leave the nozzle at supersonic speeds. However, the invention is still effective at high subsonic speeds so long as the flow is fast enough to create a negative pressure in the disc of air leaving the deflector plate sufficient to suck up foam. There is, of course, no theoretical limit to the maximum but there are practical limits as beyond about Mach 2, power requirements rise very rapidly and the efficiency may become too low for practical use. This upper limit therefore is primarily an economic one and not dictated by consideration of operativeness.

Figure 5:
FIG. 5 is a cross-section through a modified deflector plate.
Figure 6:
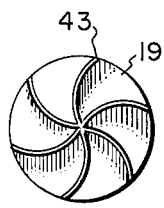
FIG. 6 is a plan view of a modified deflector plate.

FIGS. 1 to 4 illustrate a flat deflector plate. This operates well and for many uses is preferable. However, it is perfectly possible to use other deflector plate shapes. Examples are deflector plates which are convex upward, a typical form being illustrated in FIG. 5, or which have spiral ridges 43 as shown in FIG. 6, which result in a spinning disc of air leaving the deflector plate. With this modification it is also possible to permit the deflector plate itself to spin which is desirable in certain cases. The present invention functions by reason of the production of a negative pressure beneath the disc of air leaving the deflector plate and within broad limits the particular contour of the deflector plate is more or less immaterial so long as the desired results are produced. However, the simple forms shown in FIGURES 1 to 6 operate effectively and for many uses are preferred.

Figure 7:
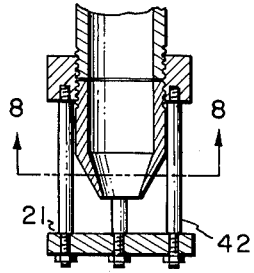
FIG. 7 is a vertical section of a modified deflector plate support.
Figure 8:
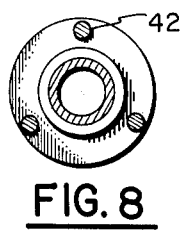
FIG. 8 is a horizontal section along the line 8—8 of FIG. 7.

In FIGURES 1 to 6 the deflector plate has been shown as supported by a central stem. For many instruments this is a simple and effective design and as has been pointed out above permits a wide range of adjustment at several fixed distances. However, particularly where a fixed adjustment can be used or at least the adjustment does not have to be changed while the machine is operating, it is entirely feasible to support the deflector plate externally. This is shown in FIGS. 7 and 8 where the plate is mounted on three rods 42. This construction is not as readily adjustable but it is somewhat stiffer and where a fixed or semi-fixed distance between deflector plate and nozzle can be used it constitutes a more rugged construction which is sometimes of value when exceptionally high air pressures are used.

As the disc of air moves outwardly from the deflector plate its velocity begins to drop and even with maximum initial velocity there is a practical limit beyond which the velocity of the disc of air is insufficient to create the necessary negative pressure to bring up foam. There is no sharp limit, good results being obtained with discs a foot or more in diameter. However, if the present invention is used in very large containers, for example, a tank six or eight feet in diameter, a single, centrally located nozzle and deflector plate will not be sufficient. It is perfectly possible however to use a number of nozzles and deflector plates arranged, symmetrically or otherwise, across the surface of the container in accordance with the foaming conditions. While the destruction of the foam is effected by the violent accelerations of the rapid disc of air the condensed foam has to be returned in some manner. In the case of a smaller container the container walls encounter the droplets from the broken foam and it runs back. In a very large container with a number of nozzles the walls may be too far and intermediate baffle walls may of course be used.

The deflector plates illustrated are horizontal. For most operations this is preferred but the invention operates entirely satisfactorily with tilted plates and under certain conditions this may be advantageous. It is a further illustration of the flexibility of the present invention.

The location of the nozzles and deflector plates a little above the liquid level in the container is ordinarily the one which functions best for continuous defoaming. However, the present invention also lends itself for emergency situations, that is to say, for conditions when normally it is not necessary to defoam but the foam may suddenly rise to greater heights when the process does not operate as intended. In such cases the nozzles and plates may be located so far above the liquid level that normally they do not exert any defoaming action but are there to take care of emergencies created by excess foam. Under such circumstances it is entirely feasible to have a warning signal as the foam rises so that the jets and deflectors need not operate continuously. In other words, an actuating signal can control or trigger a mechanism which will start the defoamer.

It should be understood that, according to the industrial results desired, the process which is the subject of this invention can be performed with various gas volumes at any temperatures or at multiple pressures, and that within the scope of the invention, the structure and details of the apparatus here above described, the size and shape of its components (different types of nozzles, size of the stem or deflector) can be altered as can their setting (different portions of the device above or below the foam level).

Figure 9:
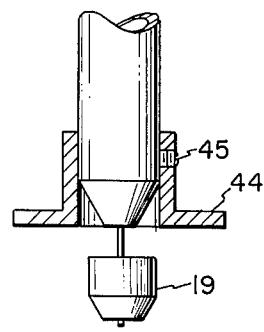
FIG. 9 is a detail of an additional upper deflection plate.

FIGS. 1 to 8 have shown nozzles with the deflection plates below the nozzle. This constitutes the principal essentials of the invention. However, sometimes improvements can be obtained by further restricting the flow of the disc of air. After it leaves the deflector plate, it begins to fan out both up and down, which results in a slowing down of the air speed. Some improvement can be made by deflecting the rising portion of the disc. This is shown in FIG. 9, an adjustable deflection plate 44 being fastened to the conduit 15 by a setscrew 45. The adjustment of the deflection plate is quite precise. If it is too high, of course it has no effect. As it is gradually lowered, the velocity of the air increases, as can be measured by the amount or distance through which the foam is sucked up. Soon the increased suction reaches a maximum and further lowering of the plate does not contribute any additional benefit and in fact the efficiency drops off quite sharply. Since the position of the upper deflector plate must be adjusted precisely, it is made adjustable and the best position has to be found by experiment for any particular combination of air pressures and nozzle deflection plate dimensions.

We claim:

1. A process for destroying foam in a container, which comprises: sucking up foam from said container into a sheet-like stream of deflected gas moving radially and horizontally in all directions from a central source thereof at high velocity and for a radial distance sufficient to enable a substantial portion of foam to be reduced to droplets before striking said container, said stream of gas being formed from gas traveling at substantially supersonic velocity.

2. A process according to claim 1 wherein said central source of gas is introduced through a vertically disposed, downwardly pointed nozzle having a deflection surface below and coaxially disposed relative to the outlet of said nozzle and sufficiently close to said nozzle so that gas flowing out of said nozzle at substantially supersonic velocity is deflected horizontally to form said generally horizontal stream moving at high velocity, the diameter of the periphery of said surface and the elevation of said surface above said foam in said container being selected to affect a substantial quantity of foam in said container.

3. A process according to claim 2 wherein said gas is air.

References Cited by the Examiner

UNITED STATES PATENTS

| 225,092 | 3/1880 | Alderson et al. | 239—524 X |
|---|---|---|---|
| 1,827,603 | 10/1931 | Nordell et al. | 239—524 |
| 3,056,749 | 10/1962 | Griffith | 252—361 |

REUBEN FRIEDMAN, *Primary Examiner.*

C. N. HART, *Assistant Examiner.*